United States Patent
Tichborne et al.

(10) Patent No.: US 9,144,768 B2
(45) Date of Patent: Sep. 29, 2015

(54) FUEL SYSTEM AND METHOD

(75) Inventors: Franklin Tichborne, Bristol (GB); Joseph K - W Lam, Bristol (GB); David Parmenter, Uckfield East Sussex (GB); Simon Masters, Bristol (GB)

(73) Assignee: AIRBUS OPERATIONS LTD, Bristol (GB)

( * ) Notice: Subject to any disclaimer, the term of this patent is extended or adjusted under 35 U.S.C. 154(b) by 973 days.

(21) Appl. No.: 13/086,456

(22) Filed: Apr. 14, 2011

(65) Prior Publication Data
US 2011/0256042 A1   Oct. 20, 2011

(30) Foreign Application Priority Data

Apr. 14, 2010   (GB) .................................. 1006213.1

(51) Int. Cl.
*B01D 53/75* (2006.01)
*B01D 53/26* (2006.01)
*B01D 53/86* (2006.01)

(52) U.S. Cl.
CPC .............. *B01D 53/265* (2013.01); *B01D 53/75* (2013.01); *B01D 53/8668* (2013.01); *B01D 53/8671* (2013.01); *B01D 2255/10* (2013.01); *B01D 2257/104* (2013.01); *B01D 2257/7022* (2013.01); *B01D 2258/02* (2013.01); *B01D 2259/4575* (2013.01)

(58) Field of Classification Search
CPC ........ B64D 37/32; A62C 3/08; B01D 53/265; B01D 53/75
USPC .................................................. 423/210, 219
See application file for complete search history.

(56) References Cited

U.S. PATENT DOCUMENTS 3,847,298 A * 11/1974 Hamilton ...................... 220/88.3
5,575,832 A * 11/1996 Boyd ............................... 95/91
2009/0212162 A1* 8/2009 Ward .......................... 244/135 R

FOREIGN PATENT DOCUMENTS

WO   2007008730 A2   1/2007

OTHER PUBLICATIONS

GB Search Report for Application No. 1006213.1, issued Jul. 26, 2010.

* cited by examiner

*Primary Examiner* — Lindsay Low
*Assistant Examiner* — Jacob Amick
(74) *Attorney, Agent, or Firm* — Lowe Hauptman & Ham, LLP

(57) ABSTRACT

A fuel system includes a fuel tank, a vent tank fluidically connected to the fuel tank ullage, the vent tank having a duct open to the ambient atmosphere and the interior of the vent tank, and a catalyst disposed in the duct, wherein the catalyst is adapted to deplete one or more reactive components of gas flowing through the duct by catalytic reaction. Also, a method for depleting one or more reactive components of gas in the fuel system, includes depleting one or more reactive components of gas flowing through the duct using the catalyst.

19 Claims, 3 Drawing Sheets

FUEL SYSTEM AND METHOD

RELATED APPLICATIONS

The present application is based on, and claims priority from, Great Britain Application Number 1006213.1, filed Apr. 14, 2010, the disclosure of which is hereby incorporated by reference herein in its entirety.

FIELD OF THE INVENTION

The present invention relates to a fuel system and to a method for depleting one or more reactive components of gas in a fuel system.

BACKGROUND OF THE INVENTION

Fuel tanks for storing liquid fuel are used, for example, for transporting or storing fuel and on vehicles for their propulsion systems. The volume of gas above the liquid fuel within the fuel tank is known as the ullage. The ullage can contain reactive components, such as oxygen and/or fuel vapours, which can be a potential fire/explosion hazard. The term "inerting" refers to the process of depleting one or more of these reactive components to reduce this potential hazard.

Various inerting systems are known in the art. For example, the potentially explosive atmosphere in the ullage can be displaced by the addition of inert gas, such as Argon, Nitrogen, or Carbon dioxide. Particularly in the case of vehicle fuel systems, the ullage volume increases as the liquid fuel is consumed and so the inert gas needs to be added while the vehicle is in motion. Typically, the inert gas is either stored in a pressurised tank on the vehicle for use on demand, or generated on board the vehicle for immediate use.

On board generation of inert gas can have several advantages in terms of reduced weight and maintenance requirements, which are important considerations, particularly for the aircraft industry. Some known On Board Inert Gas Generation Systems (OBIGGS) for aircraft pass engine bleed air through a gas separator to produce oxygen depleted air, which is fed to the ullage. More recently, catalytic inerting systems have been proposed (see, for example, WO 2007/008730) which take oxygen and fuel vapour from the ullage and pass these over a hot catalytic bed to oxidize the fuel vapour and produce Carbon dioxide and water vapour. The Carbon dioxide inert gas is fed to the ullage in a closed loop. Where there is a negative pressure differential between the ullage and ambient, there is a net inflow of oxygen rich ambient air into the fuel tank through its vent. This negative pressure differential can arise due to a reduction in fuel level in the tank as the fuel is being consumed, and also due to changes in ambient pressure due, for example, to a decrease in height. Whilst the oxygen in the air which enters the ullage through the vent will, over time, be fed to the catalyst to be consumed in the catalytic reaction, it is desirable to prevent this oxygen rich air from entering the ullage in the first place.

SUMMARY OF THE INVENTION

A first aspect of the invention provides a fuel system comprising a fuel tank, a vent tank fluidically connected to the fuel tank ullage, the vent tank having a duct open to the ambient atmosphere at one end and open to the interior of the vent tank at its opposite end, and a catalyst disposed in the duct, wherein the catalyst is adapted to deplete one or more reactive components of gas flowing through the duct by catalytic reaction.

A further aspect of the invention provides a method for depleting one or more reactive components of gas in a fuel system, wherein the fuel system comprises a fuel tank, a vent tank fluidically connected to the fuel tank ullage, the vent tank having a duct open to the ambient atmosphere at one end and open to the interior of the vent tank at its opposite end, and a catalyst disposed in the duct, the method comprising depleting one or more reactive components of gas flowing through the duct using the catalyst.

The reactive components to be depleted by the catalyst may include oxygen and/or fuel vapour.

This invention is advantageous in that by providing the catalyst in the duct, the catalyst can be used to reduce the oxygen content of ambient air flowing through the duct towards the ullage, thereby inerting the ullage. Since the ingress ullage air is Mated at source, i.e. at the duct, there is no requirement for inerting distribution pipework, saving wing installation costs and weight.

For the catalytic reaction, a supply of fuel vapour may be fed to the catalyst. Preferably, the fuel vapour is extracted from the ullage. The fuel system therefore preferably includes a vapour feed line for delivering a supply of fuel vapour from the ullage into contact with the catalyst. This has the additional advantage of reducing the fuel vapour content of the ullage as well as its oxygen content. Of course, the catalyst could be supplied with fuel from another source, if desired.

Preferably, the system includes a pump for delivering the supply of fuel vapour in the vapour feed line and/or a valve for controlling the delivery of fuel vapour in the vapour feed line.

The system may further comprise an oxygen sensor in the duct, wherein the sensor is connected to a controller for controlling the delivery of fuel vapour in the vapour feed line. Preferably, the sensor is disposed just downstream of the catalyst in the direction of in-flowing air. The controller may be adapted such that just enough fuel vapour is delivered to the catalyst to maintain a complete catalytic reaction. In this way, the oxygen content of the in-flowing air leaving the catalyst may be substantially zero.

Various heat sinks may be used to remove waste heat from the catalytic reaction. For example, the liquid fuel in the fuel tank may be warmed. A temperature sensor may be provided to monitor the fuel temperature and slow or stop the catalytic reaction if the fuel temperature exceeds a predetermined threshold. Where the fuel system is employed on a vehicle, the waste heat may additionally or alternatively be transferred into the airflow over the vehicle. In particular, where the vehicle is an aircraft the vent tank will typically be located at the wing tips, which beneficially is where the airflow cooling effect is greatest.

The system may further comprise a dehumidifying device disposed in the duct between the catalyst and the interior of the vent tank. The dehumidifying device may be beneficial since a product of fuel combustion by the catalyst is water, which is an undesirable contaminant in fuel systems. By providing the dehumidifying device between the catalyst and the interior of the vent tank, water from the ambient air and/or generated by the catalytic reaction may be substantially removed from the air flowing towards the interior of the vent tank through the duct. This reduces the need for water drainage maintenance of the fuel tanks.

The dehumidifying device may be of a refrigerative type having a refrigerating element in contact with air flowing through the duct.

The refrigerating element may include one or more condensing cold plates.

The refrigerating element may be connected in a refrigeration cycle to a compressor. Alternatively, the refrigerating element can be cooled electronically, such as by a Peltier effect device, for example.

The cold plate may have a plurality of ribs on its surface. As water (either from the ingress ambient air or generated by the catalytic reaction) condenses out of the air flow on the surface of the cold plate through nucleation and growth it beads in grooves between the ribs. The cold plate may be arranged substantially vertically with the ribs inclined with respect to the direction of the in-flowing air. The combined effect of gravity and the air flow encourages the water beads to flow towards the bottom of the plate. To increase the efficiency of the refrigerative dehumidifying device, the cold plate may be one of an array of similar cold plates. These may be arranged side by side to allow the air flow to pass between adjacent plates.

Water from the refrigerative dehumidifying device may be collected in a sump. In a preferred embodiment, the sump is disposed beneath an array of vertically arranged cold plates. The location and shape of the sump can be tailored according to the refrigerating element(s) used. The sump may need to be drained and this may be done periodically, e.g. during maintenance activities, but is preferably done continuously whilst the device is operating. For example, a discharge tube may be used to pass condensate from the refrigerating element to the ambient atmosphere. The discharge tube may be connected at one end to the sump. Where the fuel system is used on a vehicle, e.g. an aircraft, the other end of the discharge tube may be exposed to airflow over the vehicle. Motion of the vehicle may be used to generate suction within the discharge tube drawing the water out into the atmosphere. This is preferable as no active pumping is required, which reduces power consumption and parts. However, a pump may be used if desired.

A temperature sensor may be provided for monitoring the temperature of the refrigerating element. The rate of cooling the refrigerating element can be increased if the temperature is too high to optimally dehumidify the air. The latent heat of the water condensing on the refrigerating element should keep the element from freezing over. However, if the temperature drops below a predetermined threshold, then cooling of the refrigerating element can be stopped. Some vehicles, particularly aircraft, can be subjected to extreme weather conditions and so it may also be desirable to provide anti-icing measures for the dehumidifying device. For example, the discharge tube may be heated by an additional heating element, such as an electric heater. A suitable heating element may also be used for heating the refrigerating element.

Waste heat from the catalytic reaction may be used to prevent icing of components of the dehumidifying device, e.g. the discharge tube and/or the refrigerating elements.

Where the refrigerating element is cooled by a Peltier effect device, it may be operable to perform a self-defrosting function.

In a preferred implementation, the fuel system may be on an aircraft and the duct may be a NACA duct of a fuel tank ventilation system. Many aircraft have wing fuel tanks and so it is common for the fuel tank ventilation system to include NACA ducts which vent to the atmosphere from the lower wing surface. Sonic, particularly large, aircraft include a vent tank at each wing tip, and the NACA duct can be disposed in the vent tank and opens inside the tank. In some circumstances, it may be possible to substitute or modify an existing NACA duct assembly to incorporate the invention.

NACA duct assemblies typically include a, so-called, flame arrestor. This ensures ignition sources are isolated from the fuel tank. The catalyst could have the dual function of also acting as a flame arrestor and could therefore occupy that part of the NACA duct. For example, the catalyst could be formed as a porous metal matrix.

The catalyst may be operable whenever the fuel system is active, although the catalytic reaction would only occur when the reactive components) are in contact with the catalyst.

The dehumidifying device may be operable when there is a net inflow of air into the fuel tank via the duct. Where the fuel system is employed on an aircraft, the dehumidifying device may therefore be operated during the descent phase of an aircraft flight where there is a net inflow of air into the fuel tank via the duct due to the increasing pressure differential. It may also be desirable to operate the dehumidifying device during the cruise.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
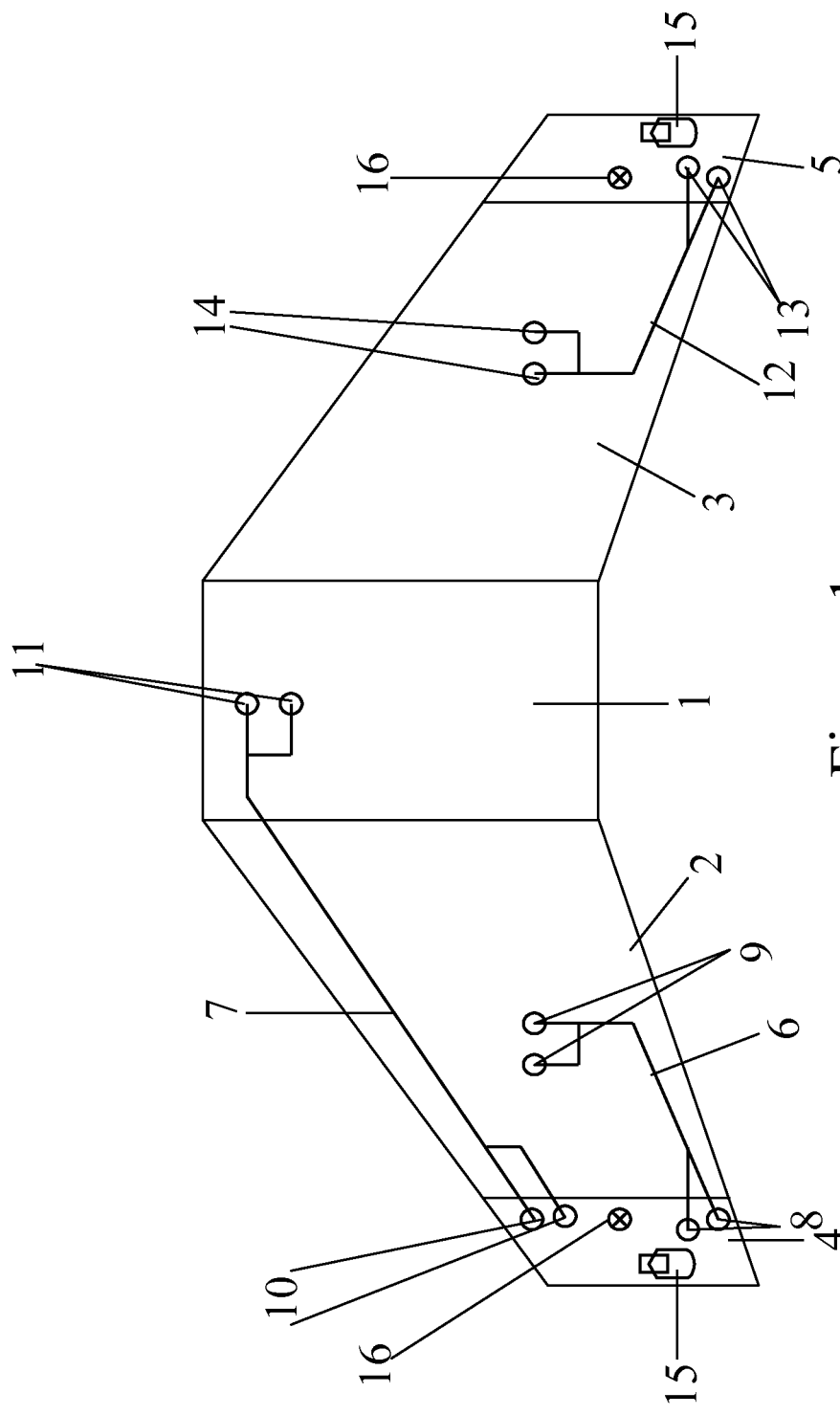
FIG. 1 illustrates schematically an aircraft wing having three fuel tanks.

FIG. 1 shows a general ventilation system architecture for a three-tank configuration of an aircraft fuel system. The fuel system includes a centre tank 1, a left wing tank 2 and a right wing tank 3. The ventilation system includes a left vent tank 4 and a right vent tank 5. The left vent tank 4 ventilates the centre tank 1 and the left wing tank 2 by means of ventilation pipes 6, 7 which open into ventilation inlets 8, 9, 10, 11. The right vent tank 5 ventilates the right wing tank 3 by means of ventilation pipe 12 which opens into ventilation inlets 13 and 14.

Each vent tank 4, 5 includes a NACA duct assembly 15 including a NACA vent, or NACA scoop, which opens to the atmosphere on the lower aerodynamic surface of the aircraft wing. The vent tanks 4, 5 further include an over pressure protector 16.

Figure 2:
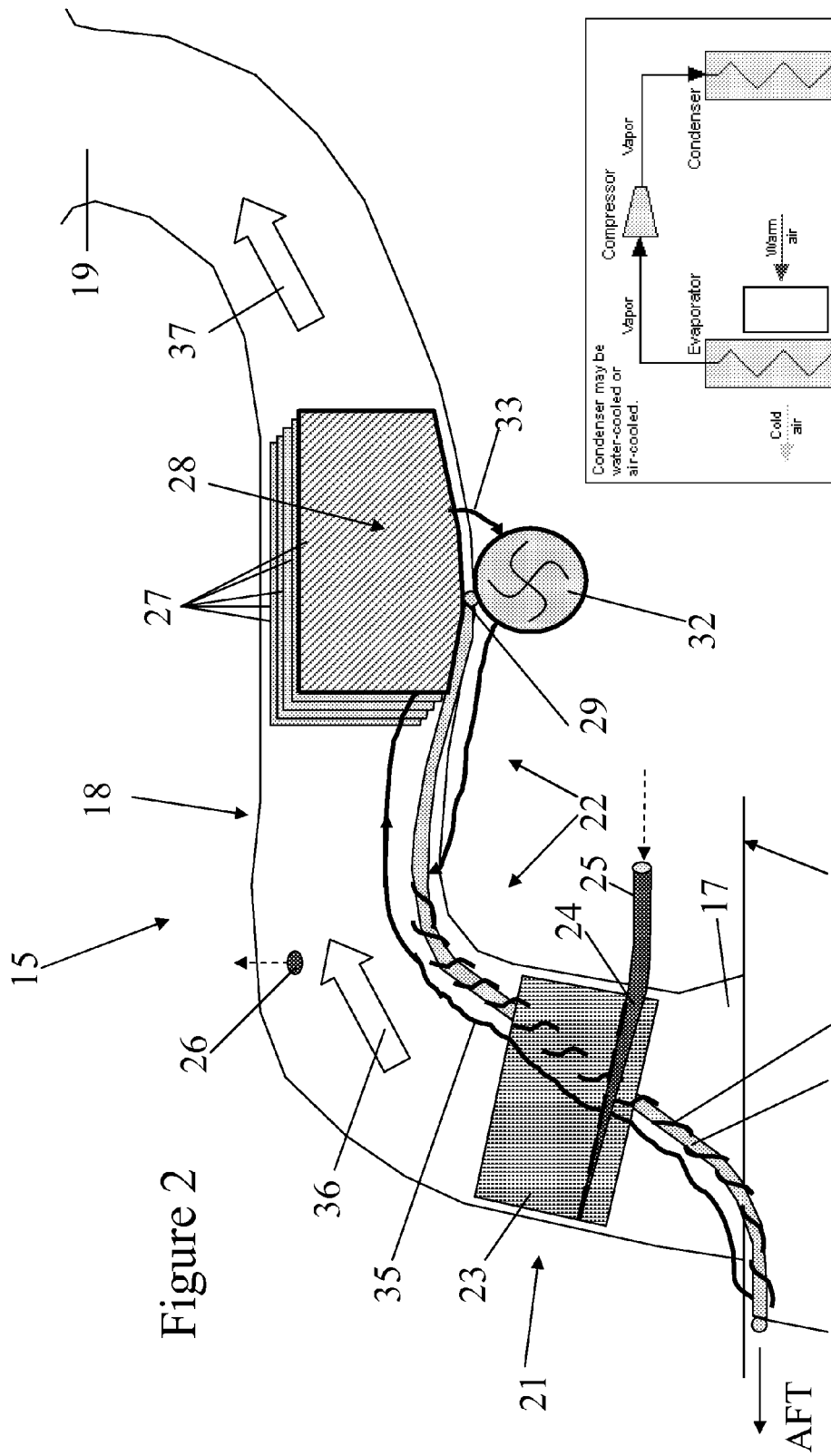
FIG. 2 illustrates schematically a NACA duct assembly for venting the fuel tank(s)

One of the NACA duct assemblies 15 is shown schematically in FIG. 2. The NACA duct assembly 15 includes a vent (or inlet) 17, a duct 18, and a "bellmouth" outlet 19. The NACA vent 17 opens in the lower surface 20 of the aircraft wing. The bellmouth outlet 19 opens into the respective vent tank 4, 5. The duct assembly 15 further includes a catalytic inerting device 21 and a dehumidifying device 22.

The catalytic inerting device 21 includes a catalyst matrix 23 disposed within the duct 18, a fuel vapour injector 24 and an oxygen sensor 26. The fuel vapour injector 24 is connected to the ullage of at least one of the fuel tanks 1, 2, 3 by a vapour feed line 25. The fuel vapour injector 24 includes a pump and is adapted to deliver a supply of fuel vapour from the fuel tank ullage into contact with the catalyst 23. The oxygen sensor 26 is mounted within the duct 18 downstream of the inlet in the direction of in-flowing air. The oxygen sensor 26 is connected to a controller (not shown) for controlling a valve (not shown) on the vapour teed line 25 for controlling the delivery of fuel vapour in the vapour feed line. The catalyst 23 doubles as a flame arrestor 16 and prevents ignition sources from entering the fuel tanks via the ventilation system.

The catalyst 23 preferably includes one or more noble metals arranged as a porous metal matrix. Other metallic and non-metallic catalyst materials may alternatively be used as will be appreciated by those skilled in the art. Depending on the catalyst used, a separate flame arrestor may be additionally required in the duct 18.

The oxygen sensor 26 is used to detect the presence of oxygen inside the duct 18. When the oxygen content of gas in the duct 18 is detected to be above a predetermined level, the controller (not shown) controls the delivery of fuel vapour into contact with the catalyst 23 using the fuel vapour injector 24. The oxygen and fuel vapour in contact with the catalyst are combusted by catalytic reaction to produce Carbon dioxide and water vapour. If the oxygen content in the duct 18, as detected by the sensor 26, remains above the predetermined threshold level then the supply of fuel vapour to the catalyst is increased by the controller. Once the oxygen content in the duct, as detected by the sensor 26, is reduced to below the threshold level then the controller temporarily stops the supply of fuel vapour to the catalyst. In this way, a complete catalytic reaction can be maintained to substantially replace the oxygen content of the gas entering the fuel tank ullage via the duct 18 with inert Carbon dioxide.

The catalyst 23 has to be heated to be effective. The heat of combustion may be sufficient to maintain the catalyst at its operating temperature. However, at start up, an "initiator" heating element (not shown) may be required. The heating element may be positioned adjacent the catalyst 23. A catalytic temperature below 200 degrees Celsius is preferable as this is the interface temperature safety limit permitted at aircraft fuel tank walls. Most preferably, the catalytic temperature is less than 190 degrees Celsius to maintain a margin. Once the catalyst has reached operating temperature from start up, the initiator may be switched off.

An unwanted bi-product of the catalytic reaction is water, which is detrimental to fuel systems. The dehumidifying device 22 acts to remove water vapour from the gas flowing through the duct 18 towards the fuel tank ullage. Beneficially, the dehumidifying device 22 removes water vapour which is generated by the catalytic reaction and also that which enters the duct 18 from the ambient atmosphere via the vent (inlet) 17. In this way, the gas entering the fuel tank ullage is dry and inert.

The dehumidifying device 22 is of a condensing (or refrigerating) type and includes an array of condensing cold plates 27 disposed within the duct 18. In the direction of air flowing from the inlet 17 to the outlet 19, the catalyst 23 is disposed downstream of the inlet 17 and upstream of the cold plates 27. The cold plates 27 are generally vertically arranged and each has a plurality of ribs 28 formed on the surfaces of the plates 27. The ribs are inclined downwardly with respect to the direction of air flowing from the inlet 17 to the outlet 19. A sump 29 is provided at the bottom of the cold plates 27 for collecting condensate. The sump 29 is connected to one end of a discharge tube 30, which passes within the duct 18 from the sump 29 to the NACA inlet 17. The other end 31 of the discharge tube 30 opens to the atmosphere just downstream of the NACA inlet 17 with the discharge tube outflow generally aligned with the air flow under the aircraft wing during flight.

The condensing cold plates 27 form the evaporator section in a single-stage vapour compression refrigeration cycle, which also includes a compressor 32, and refrigerant conduits 33, 34, 35. The refrigeration cycle will be described in detail later.

During the descent phase of the aircraft flight, air flows into the fuel tanks 1, 2, 3 through the NACA duct assemblies 15 having the refrigerative dehumidifying devices 22. The condensing element (cold plates 27), aligned with the airflow, interacts with the ingress humid air. Warm humid air 36 passes through the matrix of cold plates 27 with water condensing out and leaving cool dry air 37 exhausting from the matrix.

When the warm humid air 36 comes into contact with the cold plates 27, water condenses out from the humid air onto the cold plates through nucleation and growth. The condensed water then runs down the ribs 28 on the cold plates 27 under gravity and shear of flowing air. It is collected in the sump 29 at the bottom of the cold plate matrix.

The discharge tube 30 drains the water from the sump 29 by an airflow suction effect. The ambient air flowing over the discharge tube outlet 31 due to the forward motion of the aircraft creates a low pressure at the outlet 31. With the head of water in the sump 29 and a low pressure at the tube outlet 31, water is forced through the discharge tube 30 flowing from the sump 29 to the outlet 31.

Figure 3:
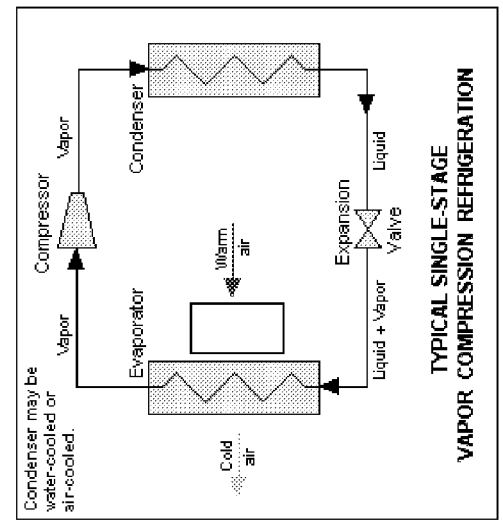
FIG. 3 illustrates schematically a typical single-stage vapour compression refrigeration cycle.

FIG. 3 illustrates schematically a typical vapour compression cycle. Essentially, the cycle moves heat from one location (the 'source', 'heat source' or 'evaporator') to another location (the 'sink', 'heat sink' or 'condenser') using mechanical work (by a compressor). It works by exploiting the physical properties of an evaporating and condensing fluid known as a refrigerant. The cold plates 27 serve as the heat source (evaporator) and the discharge tube 30 serves as the heat sink (condenser) in the refrigeration cycle.

Heat is transferred from the warm humid air 36 through the cold plates 27 to vaporized refrigerant in refrigerant conduit 33. The compressor 32 delivers the vaporized refrigerant from the heat source (cold plates 27) under high pressure and temperature to the heat sink (discharge tube 30). The cool water in the discharge tube 30 absorbs the heat through the walls of the discharge tube 30 from the vaporized refrigerant passing in refrigerant conduit 34, which is helically wound around the tube 30. The cool water condenses the refrigerant in conduit 34 and itself becomes heated in the process. The liquid refrigerant then enters a throttle valve (not shown in FIG. 2) and, expanding, comes out as a liquid-vapour mixture at a lower temperature and pressure, which passes along refrigerant conduit 35 towards the cold plates 27. It then enters the evaporator (cold plates 27), where the liquid is evaporated by contact with a comparatively warmer space. The vapour then passes along conduit 33 to the compressor 32, and the cycle is repeated.

A positive bonus of using the discharge tube 30 as the condenser in the refrigeration cycle is that it keeps the water from freezing up in the tube 30 and thereby allowing uninterrupted flow of water even at low temperatures.

Provision is made to regulate the cold plate 27 temperature to avoid ice building up on the cold plate surfaces through a simple control. The control may be simply a feedback control. For example, a temperature sensor (not shown) on the cold plate 27 can feed a signal to the compressor 32 controller. The compressor is switched on during the descent phase of the flight and when the cold plate 27 temperature is above 0 degrees Celsius. The compressor 32 may be switched off at all other phases of the flight. The rate of cooling the cold plate 27 can be increased if the temperature is too high to optimally dehumidify the air. The latent heat of the water condensing on the cold plate should keep it from freezing over. However, if the temperature drops below a predetermined threshold, then cooling of the cold plate 27 can be stopped.

Since aircraft can be subjected to extreme weather conditions, it may also be desirable to provide anti-icing measures for the dehumidifying device 22. For example, the discharge tube 30 may be heated by an additional heating element, such as an electric heater. A suitable heating element may also be used for heating the cold plate 27. For simplicity, the same heating element may be used for heating the cold plate 27 and the discharge tube 30.

Since the refrigerative dehumidifying device 22 can be incorporated into a NACA duct assembly, the NACA duct assembly having the dehumidifying device can be used as a direct replacement for existing NACA duct assemblies on existing aircraft designs.

Figure 4:
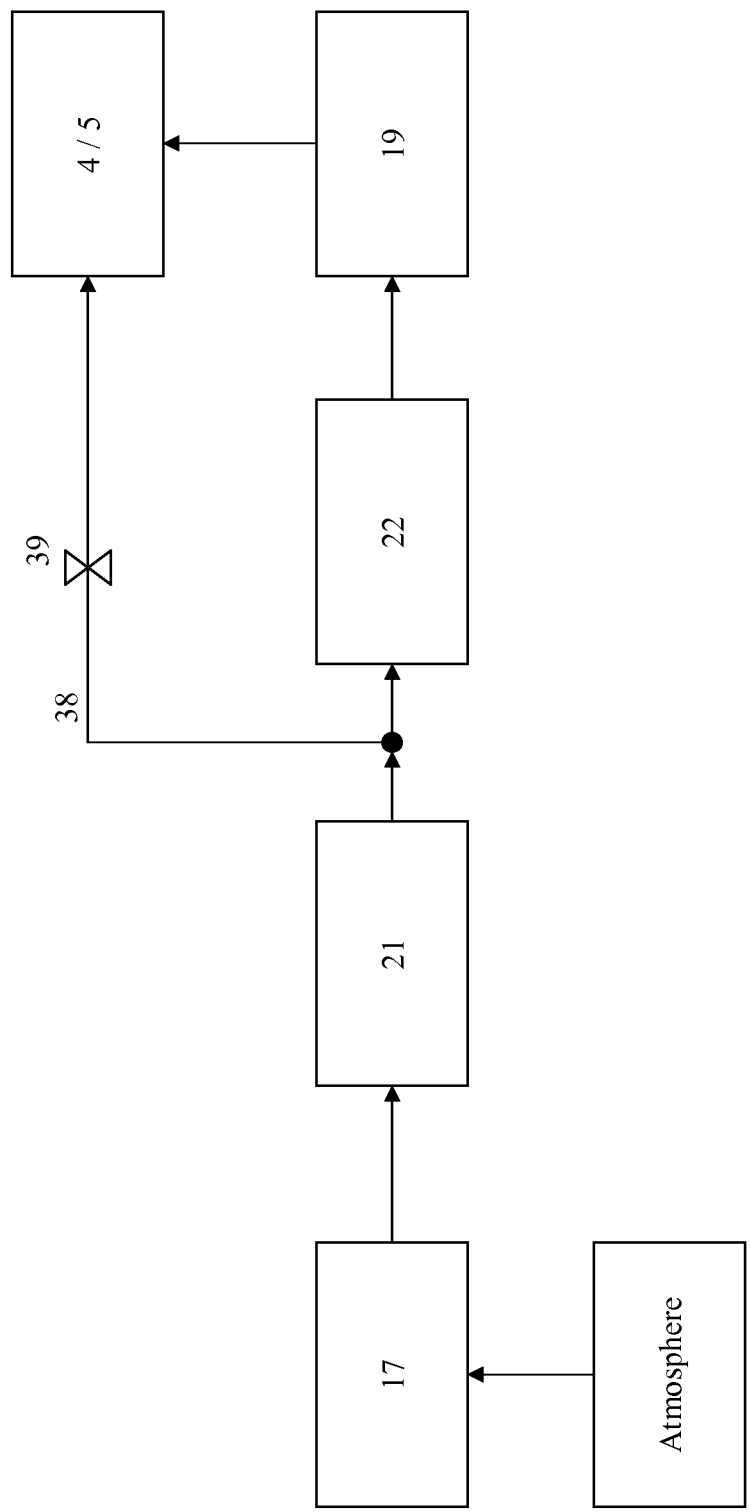
FIG. 4 illustrates a block diagram of an alternative configuration in which the dehumidifying device has a bypass.

FIG. 4 shows a block diagram of a second embodiment of the ventilation system in which the dehumidifying device 22 has a bypass. A bypass conduit 38 having a valve 39 is connected between the catalytic inerting device 21 and its respective vent tank 4, 5. In all other respects, the second embodiment is identical to the first. The valve 39 is selectively openable to control flow of air through the bypass 38. In an extreme event, when the dehumidifying device 22 is blocked (e.g. due to icing or otherwise), the bypass valve 39 is opened to allow free passage of air to flow between the ambient atmosphere and the vent tank 4, 5. The direction of the air flow through the bypass 38 would be dependent on the pressure differential between ambient and that of the vent tanks 4, 5. A pressure sensor (not shown) is connected to a controller (also not shown) for controlling the operation of the valve 39 in the bypass 38 of each of the dehumidifying devices 22. The pressure sensors may be located within the vent tanks 4, 5, for example.

Although the invention has been described in relation to a three-tank aircraft fuel system, the invention is applicable to a fuel system having any number of tanks, including one, for the storage or transportation of fuel for any purpose.

As an alternative to discharging the condensate from the dehumidifying device continuously, it is also possible to drain the condensate from the sump periodically during ground maintenance activities, or else mix it with fuel and feed it to the aircraft engines to be burnt off during flight.

Although the invention has been described above with reference to one or more preferred embodiments, it will be appreciated that various changes or modifications may be made without departing from the scope of the invention as defined in the appended claims.

The invention claimed is:

1. A fuel system comprising a fuel tank, a vent tank fluidically connected to the fuel tank ullage via ventilation pipes, the vent tank having a duct extending from the vent tank and open to the ambient atmosphere at one end and open to the interior of the vent tank at its opposite end, and a catalyst disposed in the duct, wherein the catalyst is adapted to deplete one or more reactive components of gas flowing through the duct by catalytic reaction, and wherein the system is configured to deliver gas from the catalyst in the duct to the ullage, via the ventilation pipes.

2. A system according to claim 1, further comprising a vapour feed line for delivering a supply of fuel vapour from the fuel tank ullage into contact with the catalyst.

3. A system according to claim 2, further comprising a pump for delivering the supply of fuel vapour in the vapour feed line.

4. A system according to claim 2, further comprising a valve for controlling the delivery of fuel vapour in the vapour feed line.

5. A system according to any of claim 2, further comprising an oxygen sensor in the duct and connected to a controller for controlling the delivery of fuel vapour in the vapour feed line.

6. A system according to claim 1, wherein the reactive components include oxygen or fuel vapour.

7. A system according to claim 1, further comprising a dehumidifying device disposed in the duct between the catalyst and the interior of the vent tank.

8. A system according to claim 7, wherein the dehumidifying device is of a refrigerative type having a refrigerating element in contact with gas flowing through the duct.

9. A system according to claim 8, wherein the refrigerating element includes one or more condensing cold plates.

10. A system according to claim 8, wherein the refrigerating element is connected in a refrigeration cycle to a compressor.

11. A system according to any of claim 8, further comprising a discharge tube adapted to pass condensate from the refrigerating element to the ambient atmosphere.

12. A method for depleting one or more reactive components of gas in a fuel system, wherein the fuel system comprises a fuel tank, a vent tank fluidically connected to the fuel tank ullage via ventilation pipes, the vent tank having a duct extending from the vent tank and open to the ambient atmosphere at one end and open to the interior of the vent tank at its opposite end, and a catalyst disposed in the duct, the method comprising depleting one or more reactive components of gas flowing through the duct using the catalyst, and wherein the system is configured to deliver gas from the catalyst in the duct to the ullage, via the ventilation pipes.

13. A method according to claim 12, further comprising delivering a supply of fuel vapour into contact with the catalyst.

14. A method according to claim 12, wherein the catalyst is used to reduce the oxygen content of air flowing through the duct towards the vent tank.

15. A method according to any of claim 12, wherein the fuel system further comprises a dehumidifying device disposed in the duct between the catalyst and the vent tank, and the method further comprises using the dehumidifying device to remove water vapour from the gas flowing through the duct towards the vent tank.

16. A method according to claim 15, wherein the dehumidifying device removes water vapour contained in the air entering the duct and/or generated by the catalytic reaction in the duct.

17. A method according to claim 16, further comprising using excess heat generated by the catalytic reaction to prevent icing of the dehumidifying device.

18. A method according to claim 12, wherein the catalyst is used to reduce the fuel vapour content of gas flowing through the duct towards the ambient atmosphere.

19. A system according to claim 1, wherein the reactive components include oxygen and fuel vapour.

* * * * *